US012792446B2

(12) United States Patent
Heath

(10) Patent No.: US 12,792,446 B2
(45) Date of Patent: Nov. 10, 2026

(54) INITIATING AN EMERGENCY POWER SHUTDOWN OF A MEMORY DEVICE USING SENSOR DATA

(71) Applicant: Micron Technology, Inc., Boise, ID (US)

(72) Inventor: Nicholas T. Heath, Pittsboro, NC (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/610,840

(22) Filed: Mar. 20, 2024

(65) Prior Publication Data

US 2024/0330098 A1 Oct. 3, 2024

Related U.S. Application Data

(60) Provisional application No. 63/492,436, filed on Mar. 27, 2023.

(51) Int. Cl.
*G06F 11/07* (2006.01)

(52) U.S. Cl.
CPC ........ *G06F 11/079* (2013.01); *G06F 11/0793* (2013.01)

(58) Field of Classification Search
CPC ........................... G06F 11/079; G06F 11/0793
See application file for complete search history.

(56) References Cited

U.S. PATENT DOCUMENTS

| | | | | |
|---|---|---|---|---|
| 2016/0070336 | A1* | 3/2016 | Kojima | G06F 1/263 711/103 |
| 2016/0284402 | A1* | 9/2016 | Kanai | G11C 13/0069 |
| 2017/0351456 | A1* | 12/2017 | Beulshausen | G06F 3/0634 |
| 2019/0244301 | A1* | 8/2019 | Seth | G06F 16/73 |
| 2020/0106257 | A1* | 4/2020 | Gupta | G08B 21/182 |
| 2020/0156651 | A1* | 5/2020 | Golov | G01S 13/865 |
| 2022/0413991 | A1* | 12/2022 | Kyle | G06F 11/3409 |
| 2023/0125616 | A1* | 4/2023 | Glendinning | G06F 9/44505 713/2 |
| 2023/0342258 | A1* | 10/2023 | Sethi | G06F 11/004 |

* cited by examiner

*Primary Examiner* — Jigar P Patel
(74) *Attorney, Agent, or Firm* — Harrity & Harrity, LLP

(57) ABSTRACT

In some implementations, a controller of a memory device may obtain sensor data from a sensor integrated with the memory device. The controller may compare the sensor data to a threshold. The controller may detect, based on a comparison of the sensor data and the threshold, a potential incident associated with one or more of the memory device or a vehicle associated with the memory device. The controller may initiate, based on a detection of the potential incident, an emergency power shutdown of the memory device to prevent a loss of data associated with the memory device.

20 Claims, 5 Drawing Sheets

INITIATING AN EMERGENCY POWER SHUTDOWN OF A MEMORY DEVICE USING SENSOR DATA

CROSS-REFERENCE TO RELATED APPLICATION

This Patent Application claims priority to U.S. Provisional Patent Application No. 63/492,436, filed on Mar. 27, 2023, entitled "INITIATING AN EMERGENCY POWER SHUTDOWN OF A MEMORY DEVICE USING SENSOR DATA," and assigned to the assignee hereof. The disclosure of the prior Application is considered part of and is incorporated by reference into this Patent Application

TECHNICAL FIELD

The present disclosure generally relates to memory devices, memory device operations, and, for example, to initiate an emergency power shutdown of a memory device using sensor data.

BACKGROUND

A non-volatile memory device, such as a NAND memory device, may use circuitry to enable electrically programming, erasing, and storing of data even when a power source is not supplied. Non-volatile memory devices may be used in various types of electronic devices, such as computers, mobile phones, or automobile computing systems, among other examples.

A non-volatile memory device may include an array of memory cells, a page buffer, and a column decoder. In addition, the non-volatile memory device may include a control logic unit (e.g., a controller), a row decoder, or an address buffer, among other examples. The memory cell array may include memory cell strings connected to bit lines, which are extended in a column direction.

A memory cell, which may be referred to as a "cell" or a "data cell," of a non-volatile memory device may include a current path formed between a source and a drain on a semiconductor substrate. The memory cell may further include a floating gate (or another type of NAND architecture, such as a charge trap) and a control gate formed between insulating layers on the semiconductor substrate. A programming operation (sometimes called a write operation) of the memory cell is generally accomplished by grounding the source and the drain areas of the memory cell and the semiconductor substrate of a bulk area, and applying a high positive voltage, which may be referred to as a "program voltage," a "programming power voltage," or "VPP," to a control gate to generate Fowler-Nordheim tunneling (referred to as "F-N tunneling") between a floating gate and the semiconductor substrate. When F-N tunneling is occurring, electrons of the bulk area are accumulated on the floating gate by an electric field of VPP applied to the control gate to increase a threshold voltage of the memory cell.

An erasing operation of the memory cell is concurrently performed in units of sectors sharing the bulk area (referred to as "blocks"), by applying a high negative voltage, which may be referred to as an "erase voltage" or "Vera," to the control gate and a configured voltage to the bulk area to generate the F-N tunneling. In this case, electrons accumulated on the floating gate are discharged into the source area, so that the memory cells have an erasing threshold voltage distribution.

Each memory cell string may have a plurality of floating gate type memory cells serially connected to each other. Access lines (sometimes called "word lines") are extended in a row direction, and a control gate of each memory cell is connected to a corresponding access line. A non-volatile memory device may include a plurality of page buffers connected between the bit lines and the column decoder. The column decoder is connected between the page buffer and data lines.

DETAILED DESCRIPTION

Figure 1:
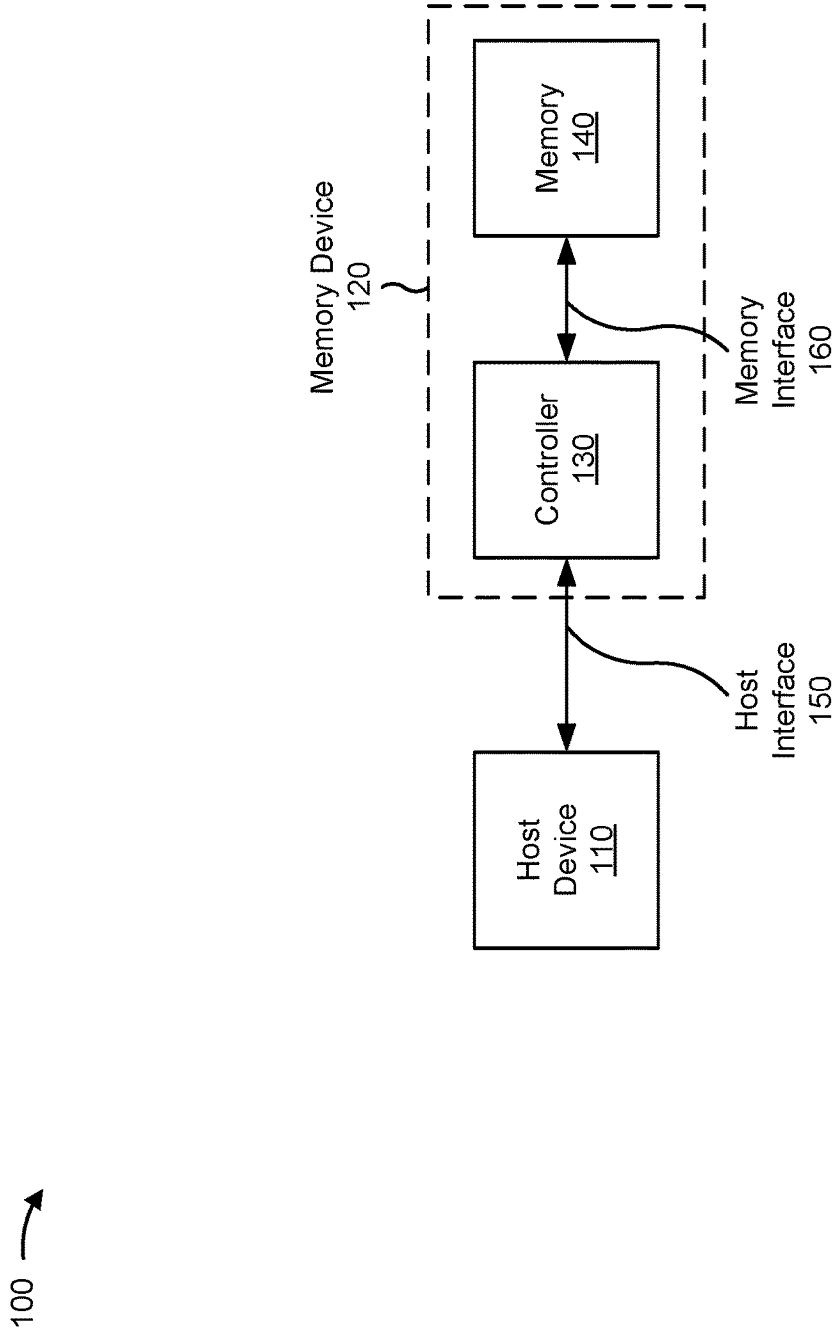
FIG. 1 is a diagram illustrating an example system capable of initiating an emergency power shutdown of a memory device using sensor data.

A memory device, such as a memory device in a vehicle, may read data and write data to a memory of the memory device. During a normal system shutdown, the memory device may receive a command (e.g., a standby immediate command) from a host device, which may indicate to the memory device that a power down is upcoming. The memory device, based on the command, may start performing various tasks. For example, the memory device may begin flushing its cache and may update its mapping tables. The memory device may complete any ongoing memory operations (e.g., read operations and/or write operations). The host device may not stop powering the memory device until all pending tasks are completed.

In some scenarios, the memory device may experience a sudden power outage. The sudden power outage may occur when the memory device is dropped in liquid or is dropped on the ground, causing significant damage to the memory device. The sudden power outage may occur when the memory device, and the vehicle associated with the memory device, is involved in a collision. During the sudden power outage, the memory device may experience a data loss. The data loss may occur because the memory device may be in the process of writing data to the memory when the sudden power outage occurs. In other words, data associated with a write operation may be lost when the write operation is ongoing when the sudden power outage occurs. When the sudden power outage occurs, the memory device may have insufficient time to complete any ongoing write operations, which may result in the data loss.

The memory device may utilize a power loss protection circuit to mitigate against unexpected power losses. A power loss protection circuit may provide a power loss signal to the memory device, where the power loss signal may indicate to the memory device that power loss is imminent. The power loss protection circuit may be external to the memory device. The memory device may write any outstanding data to the memory as soon as possible, based on the power loss signal. The host device may stop sending data to the memory device based on the power loss signal. The power loss protection circuit may store energy sufficient for an emergency shutdown for the memory device. The power loss protection circuit may include capacitors or other energy storage components to provide additional power to the memory device, such that the memory device has additional time to write data to the memory after the sudden power outage occurs. The memory device may operate using the additional power to complete any ongoing write operations after the sudden power outage occurs. As a result, the power loss protection circuit may prevent the data loss due to the sudden power outage.

However, in some cases, the power loss protection circuit may be insufficient to mitigate against the data loss due to the sudden power outage. For example, when the memory device, and the vehicle associated with the memory device, are involved in an incident (e.g., an accident), the power loss protection circuit may be damaged, and thus may be unable to send the power loss signal to the memory device. The incident may prevent the power loss protection circuit from notifying the memory device of an imminent power loss. In other words, during a normal operation, the power loss protection circuit may be able to provide sufficient warning to the memory device, but the incident may damage the power loss protection circuit. The incident may cause the power loss protection circuit to fail to notify the memory device of the imminent power loss. Further, the incident may damage the capacitors or the other energy storage components, which may prevent the additional power from being provided to the memory device after the sudden power outage. Damage to backup energy storage devices (e.g., capacitors) may lead to a failure to sustain a power supply for the memory device.

In some implementations described herein, a memory device may be associated with a vehicle. For example, the memory device may be integrated with the vehicle. The memory device may include a sensor to capture sensor data. In some cases, the memory device may include multiple sensors. For example, the memory device may include an accelerometer to capture accelerometer data, and/or the memory device may include a temperature sensor to capture temperature data. The memory device may obtain the sensor data from the sensor. The memory device may compare the sensor data to one or more thresholds. For example, a first threshold may be associated with an acceleration of the vehicle, a second threshold may be associated with a deceleration of the vehicle, and a third threshold may be associated with an overheating of the memory device. The memory device may detect, based on a comparison of the sensor data and the one or more thresholds, a potential incident. The potential incident (e.g., an imminent accident involving the memory device and/or the vehicle) may be associated with the memory device and/or the vehicle in which the memory device resides. The sensor data, in relation to the one or more thresholds, may be indicative of the potential incident. The memory device, in response to detecting the potential incident, may initiate an emergency power shutdown of the memory device. By initiating the emergency power shutdown, the memory device may prevent a loss of data associated with the memory device and/or the vehicle. The data may include telemetry data associated with the vehicle. The telemetry data may include audio data and/or video data associated with the vehicle. The memory device, when initiating the emergency power shutdown, may terminate an ongoing memory operation (e.g., a read operation or a write operation) to prevent the loss of data, and/or the memory device may complete the ongoing memory operation prior to an incident actually occurring. The memory device may initiate the emergency power shutdown of the memory device without waiting for a power loss signal from a power loss protection circuit associated with the memory device.

In some implementations, the memory device may provide improved data protection, even when the incident involving the memory device and/or the vehicle occurs. The memory device may be able to protect against data loss by collecting the sensor data, and initiating the emergency power shutdown of the memory device based on the sensor data. The data loss may be avoided irrespective of whether power loss protection circuity is functional (e.g., the power loss protection circuity may become nonfunctional due to the incident). The data that is protected may be telemetry data (e.g., audio data and/or video data) associated with the vehicle, which may be crucial for data analysis post-incident, for legal purposes, and/or for technical purposes. An ability to protect data associated with the memory device when the memory device experiences incidents (e.g., accidents) may improve an overall performance of the memory device.

FIG. 1 is a diagram illustrating an example system 100 capable of initiating an emergency power shutdown of a memory device using sensor data. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or randomaccess memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include control logic, a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, one or more systems, devices, apparatuses, components, and/or controllers of FIG. 1 may be configured to obtain sensor data from a sensor integrated with the memory device 120; compare the sensor data to a threshold; detect, based on a comparison of the sensor data and the threshold, a potential incident associated with one or more of the memory device 120 or a vehicle associated with the memory device 120; and initiate, based on a detection of the potential incident, an emergency power shutdown of the memory device 120 to prevent a loss of data associated with the memory device 120. A signal may be proactively transmitted to the memory device 120 to initiate the emergency power shutdown of the memory device 120.

As indicated above, FIG. 1 is provided as an example. Other examples may differ from what is described with regard to FIG. 1.

Figure 2:
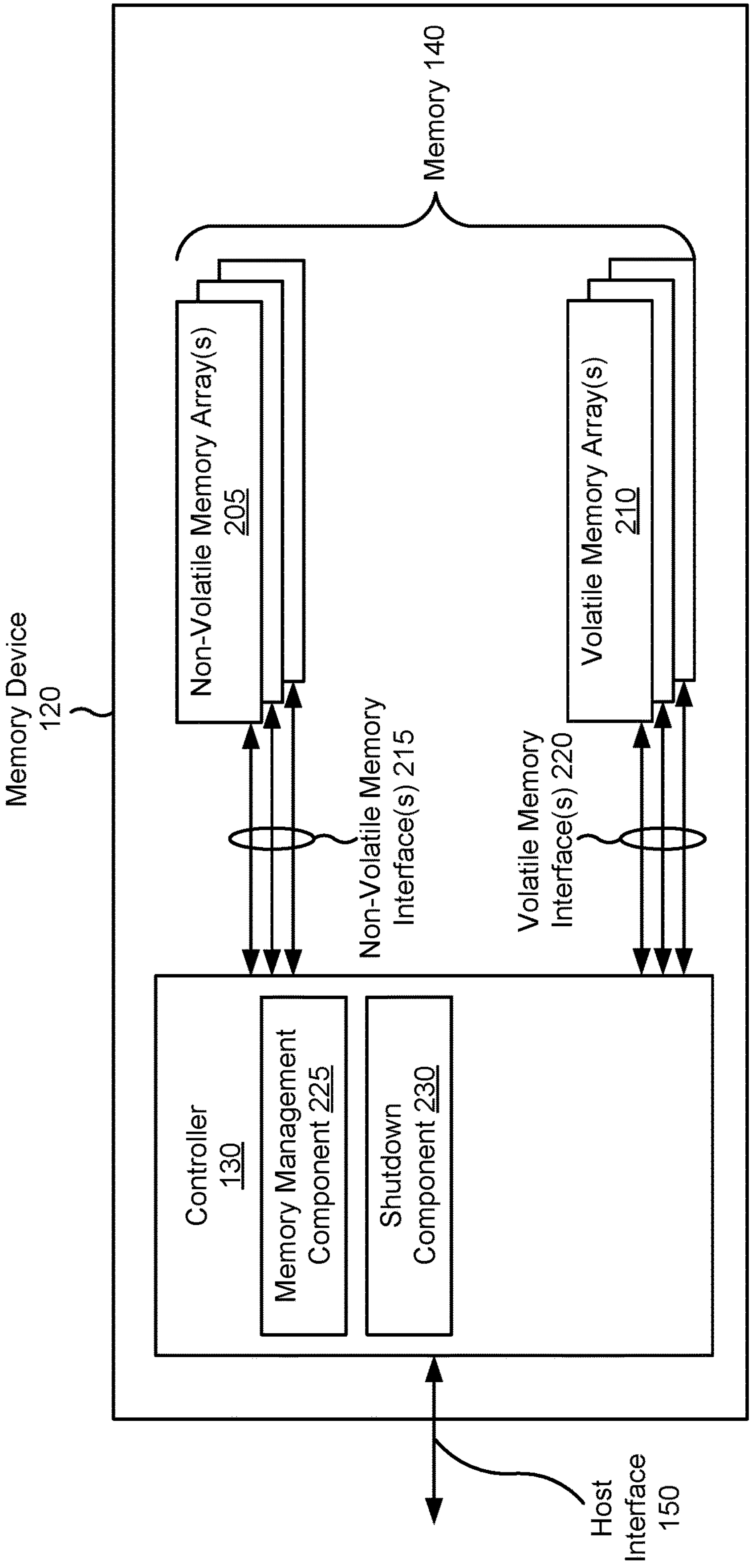
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 205, such as one or more NAND memory arrays and/or one or more NOR memory arrays. Additionally, or alternatively, the memory 140 may include one or more volatile memory arrays 210, such as one or more SRAM arrays and/or one or more DRAM arrays. The controller 130 may transmit signals to and receive signals from a non-volatile memory array 205 using a non-volatile memory interface 215. The controller 130 may transmit signals to and receive signals from a volatile memory array 210 using a volatile memory interface 220.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the controller 130 may include a memory management component 225, and/or a shutdown component 230. In some implementations, one or more of these components are implemented as one or more instructions (e.g., firmware) executed by the controller 130. Alternatively, one or more of these components may be implemented as dedicated integrated circuits distinct from the controller 130.

The memory management component 225 may be configured to manage performance of the memory device 120. For example, the memory management component 225 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 225, such as information regarding memory block age, memory block erase count, and/or error information associated with a memory partition (e.g., a memory cell, a row of memory, a block of memory, or the like).

The shutdown component 230 may be configured to obtain sensor data from a sensor integrated with the memory device 120. The shutdown component 230 may be configured to compare the sensor data to a threshold. The shutdown component 230 may detect, based on a comparison of the sensor data and the threshold, a potential incident associated with one or more of the memory device 120 or a vehicle associated with the memory device 120. The shutdown component 230 may initiate, based on a detection of the potential incident, an emergency power shutdown of the memory device 120 to prevent a loss of data associated with the memory device 120.

One or more devices or components shown in FIG. 2 may be configured to perform operations described herein, such as one or more operations and/or methods described in connection with FIGS. 3-4. For example, the controller 130, the memory management component 225, and/or the shutdown component 230 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

Figure 3:
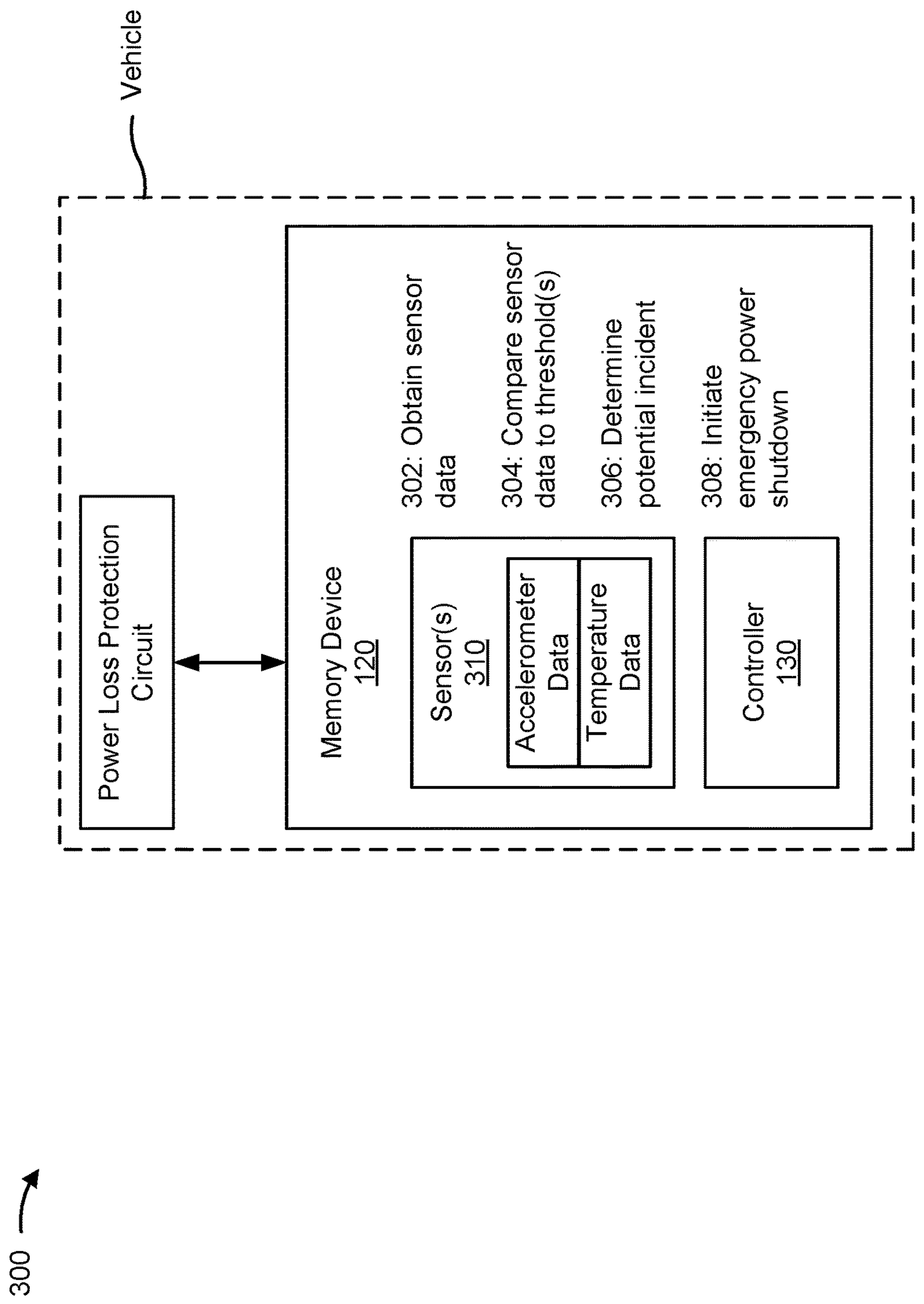
FIG. 3 is a diagram illustrating an example of initiating an emergency power shutdown of a memory device using sensor data.

FIG. 3 is a diagram of an example 300 of initiating an emergency power shutdown of a memory device using sensor data. The operations described in connection with FIG. 3 may be performed by the memory device 120 and/or one or more components of the memory device 120, such as the controller 130 and/or one or more components of the controller 130. The memory device 120 may be associated with a vehicle. For example, the memory device 120 may be on board the vehicle.

In some implementations, the vehicle may include one or more sensors 310, which may include an accelerometer and/or a temperature sensor. The sensors 310 may be configured to collect sensor data. For example, the accelerometer may collect accelerometer data, and/or the temperature sensor may collect temperature data. A sensor may collect sensor data in accordance with a defined rate (e.g., 120 samples per second), depending on a capability of the sensor.

As shown by reference number 302, the memory device 120 may obtain the sensor data from the one or more sensors 310. The memory device 120 may obtain the sensor data in accordance with the defined rate (e.g., 120 samples per second). For example, the memory device 120 may obtain the accelerometer data and/or the temperature data. The accelerometer data may indicate a change in acceleration over a period of time. The temperature data may indicate a change in temperature over a period of time.

As shown by reference number 304, the memory device 120 may compare the sensor data to one or more thresholds, which may depend on the type of sensor data. The memory device 120 may compare accelerometer data to a first threshold and/or a second threshold. For example, the memory device 120 may compare the change in acceleration over the period of time to the first threshold and/or the second threshold. The first threshold may be associated with an acceleration of the vehicle. The second threshold may be associated with a deceleration of the vehicle. For example, the memory device 120 may compare the change in temperature over the period of time to the third threshold. The memory device 120 may compare temperature data to a third threshold. Thresholds for accelerometer data may be different from thresholds for temperature data.

As shown by reference number 306, the memory device 120 may detect, based on a comparison of the sensor data and the one or more thresholds, a potential incident associated with the memory device 120 and/or the vehicle associated with the memory device 120. The potential incident may be an imminent accident involving the memory device 120 and/or the vehicle, which may result in a sudden power loss for the memory device 120. The sensor data, in relation to the one or more thresholds, may be indicative of the potential incident.

As an example, the memory device 120 may compare the acceleration data to the first threshold, and based on the comparison, the memory device 120 may determine that the vehicle is accelerating relatively rapidly, which may increase a likelihood of an incident involving the memory device 120 and/or the vehicle, which may result in sudden power loss and/or data loss for the memory device 120. As another example, the memory device 120 may compare the acceleration data to the second threshold, and based on the comparison, the memory device 120 may determine that the vehicle is deaccelerating relatively rapidly, which may increase a likelihood of an incident involving the memory device 120 and/or the vehicle, which may result in sudden power loss and/or data loss for the memory device 120. As yet another example, the memory device 120 may compare the temperature data to the third threshold, and based on the comparison, the memory device 120 may determine that the memory device 120 is being exposed to a relatively high temperature. In some cases, the memory device 120 may determine that the relatively high temperature is rapidly increasing, which may be indicated by several temperature measurements taken over a period of time. The relatively high temperature may be caused by an incident involving the memory device 120 and/or the vehicle, which may result in sudden power loss and/or data loss for the memory device 120.

As shown by reference number 308, the memory device 120 may initiate, based on the detection of the potential incident, an emergency power shutdown of the memory device 120 to prevent a loss of data associated with the memory device 120. The data may be telemetry data associated with the vehicle. The telemetry data may include audio data and/or video data associated with the vehicle. The memory device 120, when initiating the emergency power shutdown, may terminate an ongoing memory operation to prevent the loss of data. The ongoing memory operation may be an ongoing write operation or an ongoing read operation. The memory device 120, when initiating the emergency power shutdown, may complete the ongoing memory operation prior to an expected occurrence of an actual incident that causes damage to a power supply circuit associated with the memory device 120. The memory device 120 may terminate and/or complete any ongoing memory operation to reduce the risk of data associated with the ongoing memory operation being lost if the memory device 120 suddenly loses power in the middle of the ongoing memory operation. Further, the memory device 120 may initiate the emergency power shutdown of the memory device 120 without waiting for a power loss signal from a power loss protection circuit associated with the memory device 120. By the time the memory device 120 receives the power loss signal, the memory device 120 may have insufficient time to initiate the emergency power shutdown. Thus, the memory device 120 may utilize the sensor data, instead of the power loss signal, as a trigger to initiate the emergency power shutdown to avoid data loss.

In some implementations, after the emergency power shutdown is completed, the memory device 120 may still continue to operate, as long as the memory device 120 continues to be powered. When the potential incident is a false alarm (e.g., a rapid acceleration or deceleration occurs, but does not actually result in damage to the memory device 120 and/or data loss), the memory device 120 may continue to operate in a normal manner. When the potential incident is not a false alarm and actually results in damage to the memory device 120 and/or the vehicle, the data stored in accordance with the emergency power shutdown may be more likely to be successfully retrieved afterwards (e.g., assuming that the entire memory device 120 is not completely damaged and non-functional due to an actually occurring incident).

In some implementations, data loss as a result of a memory device power loss due to a vehicle accident may be prevented. An integrated accelerometer may be used within an automotive memory device to detect a sudden acceleration or deceleration of a host vehicle. Such events may be indicative of some type of vehicle impact. By enabling the memory device 120 to detect these events, the memory device 120 may take proactive actions to initiate the emergency power shutdown and safeguard critical data without waiting for the power loss signal from the power loss protection circuit. In some implementations, a routine may be implemented in a memory device firmware which periodically evaluates the acceleration data from the integrated accelerometer. Data may be retrieved from the integrated accelerometer at a sufficient rate that enables the memory device 120 to act before damage from an accident affects a power supply circuitry. The integrated accelerometer may also act as an interrupt to a critical central processing unit (CPU) core in the controller 130 of the memory device 120. When the accident is determined to be imminent, based on thresholds set of acceleration and deceleration, the memory device 120 may proactively start the emergency power shutdown to save critical data and telemetry data relevant for accident analysis. The automotive memory device may be provided with sufficient time to save off critical telemetry data, which may be used later for accident analysis. The memory device 120 may not wait for the power loss protection circuitry to notify the memory device 120, which may be based on an assumption that the power loss protection circuitry may become damaged and not reliable.

As a result, the memory device 120 may have increased reliability, since the memory device 120 may take proactive steps to protect data which may be critical for subsequent accident analysis. By implementing the proactive emergency power shutdown, the likelihood of data loss may be reduced, and an ability for the data to be analyzed post-accident for certain purposes (e.g., legal or technical purposes) may be provided. The memory device 120 may not be dependent on a host device to notify the memory device 120 that a power loss event is about to occur, as the memory device 120 may already determine that the power loss event may occur using the acceleration data.

As indicated above, FIG. 3 is provided as an example. Other examples may differ from what is described with regard to FIG. 3.

Figure 4:
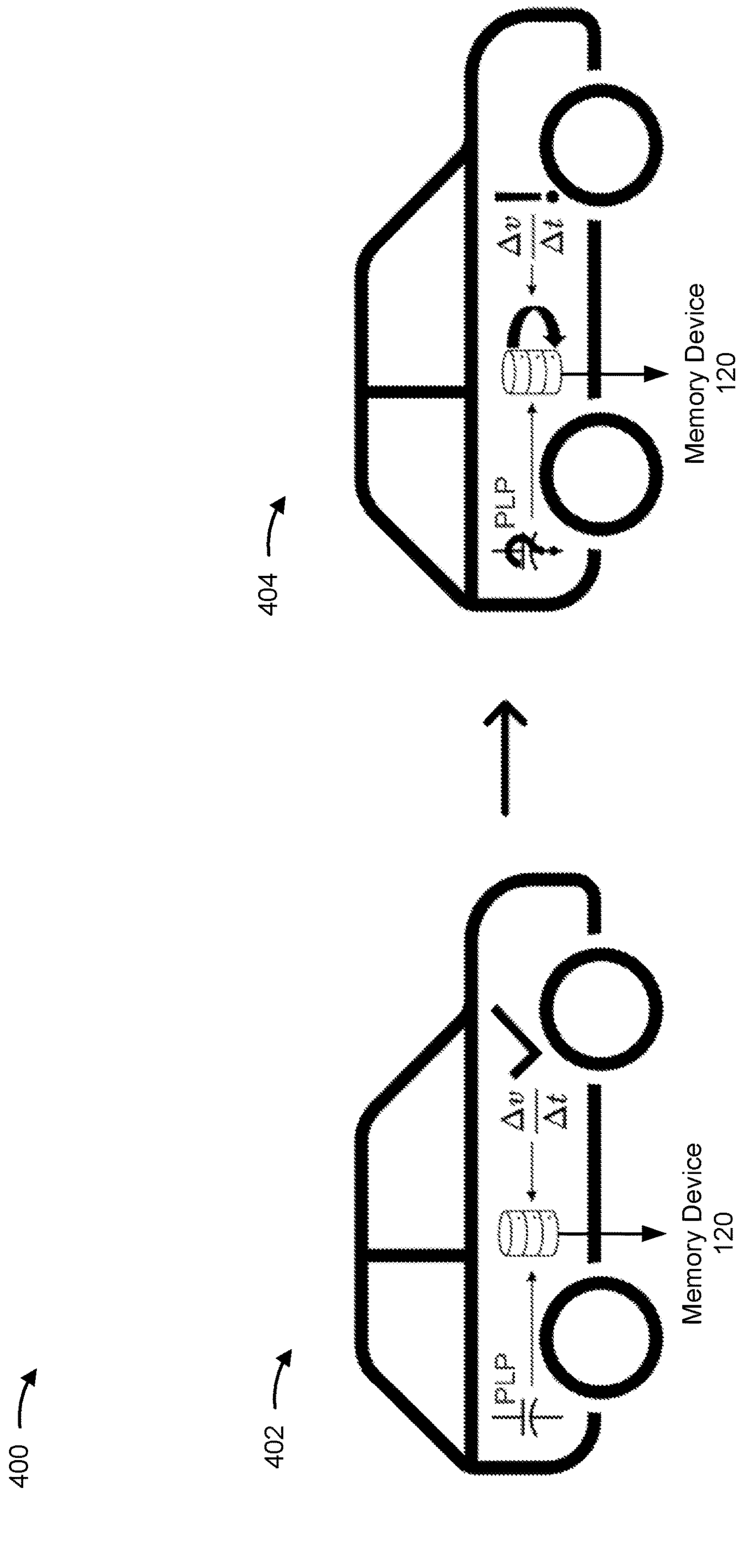
FIG. 4 is a diagram illustrating an example of initiating an emergency power shutdown of a memory device using sensor data.

FIG. 4 is a diagram of an example 400 of initiating an emergency power shutdown of the memory device 120 using sensor data. The operations described in connection with FIG. 4 may be performed by the memory device 120 and/or one or more components of the memory device 120, such as the controller 130 and/or one or more components of the controller 130.

In some implementations, the memory device 120 may be associated with a vehicle. For example, the memory device 120 may be on board the vehicle. The memory device 120 may communicate with an accelerometer, which may also be on board the vehicle. In some cases, the accelerometer may be integrated with the memory device 120. The memory device 120 may be able to communicate with a power loss protection circuit, which may also be on board the vehicle. In some cases, the power loss protection (PLP) circuit may be external to the memory device 120. For example, the power loss protection circuit may be integrated with a host device that is able to communicate with the memory device 120.

As shown by reference number 402, the memory device 120 may sense an acceleration (e.g., $\Delta v/\Delta t$) of the vehicle on a periodic basis to check whether the vehicle is accelerating or deaccelerating relatively rapidly. The memory device 120 may receive acceleration data from the accelerometer. The memory device 120 may receive the acceleration data in accordance with a defined rate, which may be sufficient to allow the memory device 120 to perform actions based on the acceleration data. The memory device 120 may determine that the acceleration data satisfies one or more thresholds, which may indicate that a potential incident involving the memory device 120 and/or the vehicle is not imminent. For example, the memory device 120 may compare the acceleration data with a first threshold associated with acceleration and/or a second threshold associated with deceleration, and based on the comparison, the memory device 120 may determine that the vehicle is not accelerating or deaccelerating relatively rapidly.

As shown by reference number 404, the memory device 120 may sense the acceleration of the vehicle on the periodic basis to check whether the vehicle is accelerating or deaccelerating relatively rapidly. The memory device 120 may receive the acceleration data from the accelerometer. The memory device 120 may receive the acceleration data in accordance with the defined rate, which may be sufficient to allow the memory device 120 to perform actions based on the acceleration data. The memory device 120 may determine that the acceleration data does not satisfy one or more thresholds, which may indicate the potential incident involving the memory device 120 and/or the vehicle is imminent.

For example, the memory device 120 may compare the acceleration data with the first threshold associated with acceleration and/or the second threshold associated with deceleration, and based on the comparison, the memory device 120 may determine that the vehicle is accelerating or deaccelerating relatively rapidly. When the memory device 120 detects that the potential incident is imminent, the memory device 120 may begin saving critical data with an assumption that power loss will occur for the memory device 120. The memory device 120 may begin saving the critical data without waiting for a power loss signal from an onboard power management integrated circuit (PMIC) or other logic circuits. As a result, the memory device 120 may prevent against data loss stemming from an actual incident that occurs.

As indicated above, FIG. 4 is provided as an example. Other examples may differ from what is described with regard to FIG. 4.

Figure 5:
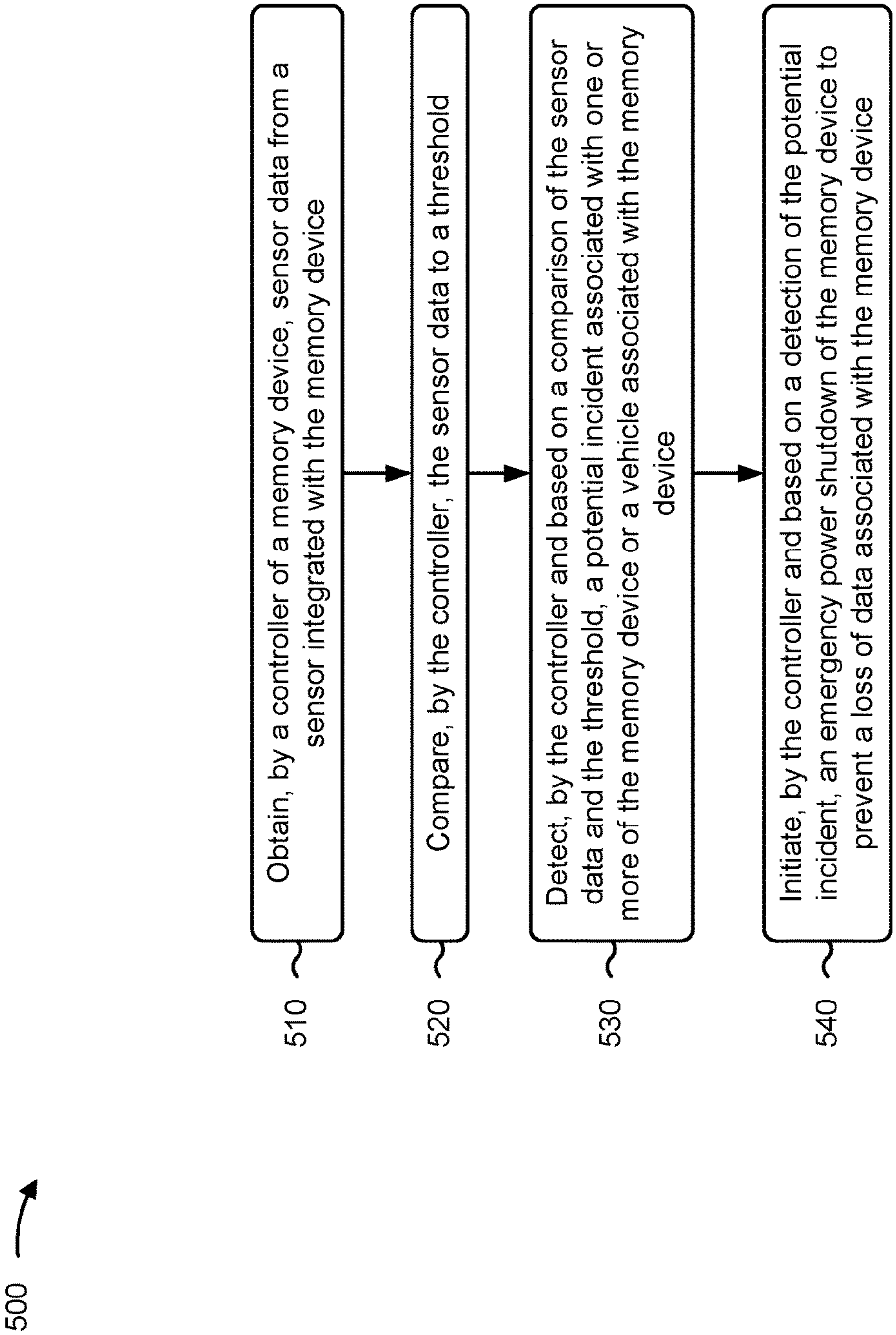
FIG. 5 is a flowchart of an example method associated with initiating an emergency power shutdown of a memory device using sensor data.

FIG. 5 is a flowchart of an example method 500 associated with initiating an emergency power shutdown of a memory device using sensor data. In some implementations, a controller (e.g., the controller 130) may perform or may be configured to perform the method 500. In some implementations, another device or a group of devices separate from or including the controller may perform or may be configured to perform the method 500. Additionally, or alternatively, one or more components of the controller may perform or may be configured to perform the method 500. Thus, means for performing the method 500 may include the controller and/or one or more components of the controller. Additionally, or alternatively, a non-transitory computer-readable medium may store one or more instructions that, when executed by the controller, cause the controller to perform the method 500.

As shown in FIG. 5, the method 500 may include obtaining sensor data from a sensor integrated with the memory device (block 510). As further shown in FIG. 5, the method 500 may include comparing the sensor data to a threshold (block 520). As further shown in FIG. 5, the method 500 may include detecting, based on a comparison of the sensor data and the threshold, a potential incident associated with one or more of the memory device or a vehicle associated with the memory device (block 530). As further shown in FIG. 5, the method 500 may include initiating, based on a detection of the potential incident, an emergency power shutdown of the memory device to prevent a loss of data associated with the memory device (block 540).

The method 500 may include additional aspects, such as any single aspect or any combination of aspects described below and/or described in connection with one or more other methods or operations described elsewhere herein.

In a first aspect, the sensor is an accelerometer, and the sensor data is accelerometer data.

In a second aspect, alone or in combination with the first aspect, the threshold is one or more of a first threshold or a second threshold, wherein the first threshold is associated with an acceleration of the vehicle, and the second threshold is associated with a deceleration of the vehicle.

In a third aspect, alone or in combination with one or more of the first and second aspects, the sensor is a temperature sensor, and the sensor data is temperature data.

In a fourth aspect, alone or in combination with one or more of the first through third aspects, initiating the emergency power shutdown of the memory device is without waiting for a power loss signal from a power loss protection circuit associated with the memory device.

In a fifth aspect, alone or in combination with one or more of the first through fourth aspects, the data is telemetry data associated with the vehicle, and the telemetry data includes one or more of audio data or video data associated with the vehicle.

In a sixth aspect, alone or in combination with one or more of the first through fifth aspects, method 500 includes terminating an ongoing memory operation to prevent the loss of data, or completing the ongoing memory operation prior to an expected occurrence of an actual incident.

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein.

In some implementations, a memory device includes a sensor configured to capture sensor data; and one or more components configured to: obtain the sensor data; compare the sensor data to a threshold; detect, based on a comparison of the sensor data and the threshold, a potential incident associated with one or more of the memory device or a vehicle associated with the memory device; and initiate, based on a detection of the potential incident, an emergency power shutdown of the memory device to prevent a loss of data associated with the memory device.

In some implementations, a method includes obtaining, by a controller of a memory device, sensor data from a sensor integrated with the memory device; comparing, by the controller, the sensor data to a threshold; determining, by the controller and based on a comparison of the sensor data and the threshold, a potential incident associated with one or more of the memory device or a vehicle associated with the memory device; and initiating, by the controller and based on a detection of the potential incident, an emergency power shutdown of the memory device to prevent a loss of data associated with the memory device.

In some implementations, an apparatus includes means for obtaining sensor data; comparing the sensor data to a threshold; detecting, based on a comparison of the sensor data and the threshold, a potential incident associated with one or more of the apparatus or a vehicle associated with the apparatus; and initiating an emergency power shutdown of the apparatus to prevent a loss of data associated with the apparatus.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A memory device, comprising:
a sensor configured to capture sensor data; and
one or more components configured to:
obtain the sensor data;
compare the sensor data to a threshold;
detect, based on a comparison of the sensor data and the threshold, a potential incident associated with one or more of the memory device or a vehicle associated with the memory device; and
initiate, in response to detection of the potential incident and without obtaining a power loss signal from a power loss protection circuit, an emergency power shutdown of the memory device to prevent a loss of telemetry data associated with the memory device, the emergency power shutdown comprising initiating storage of the telemetry data to non-volatile memory of the memory device, wherein the power loss protection circuit is external to the memory device and wherein the power loss protection circuit is configured to provide the power loss signal to the memory device.

2. The memory device of claim 1, wherein the sensor is an accelerometer integrated with the memory device, and wherein the sensor data is accelerometer data.

3. The memory device of claim 1, wherein the threshold is one or more of a first threshold or a second threshold, wherein the first threshold is associated with an acceleration of the vehicle, and wherein the second threshold is associated with a deceleration of the vehicle.

4. The memory device of claim 1, wherein the sensor is a temperature sensor integrated with the memory device, and wherein the sensor data is temperature data.

5. The memory device of claim 1, wherein the telemetry data includes one or more of audio data or video data associated with the vehicle.

6. The memory device of claim 1, wherein the one or more components, to initiate the emergency power shutdown of the memory device, are configured to:
terminate an ongoing memory operation to prevent the loss of data; or
complete the ongoing memory operation prior to an expected occurrence of an actual incident.

7. The memory device of claim 1, wherein the one or more components, to obtain the sensor data, are configured to obtain the sensor data at a predefined sampling rate.

8. A method, comprising:
obtaining, by a controller of a memory device, sensor data from a sensor integrated with the memory device;
comparing, by the controller, the sensor data to a threshold;
determining, by the controller and based on a comparison of the sensor data and the threshold, a potential incident associated with one or more of the memory device or a vehicle associated with the memory device; and
initiating, by the controller in response to a detection of the potential incident and without obtaining a power loss signal from a power loss protection circuit, an emergency power shutdown of the memory device to prevent a loss of telemetry data associated with the memory device, the emergency power shutdown comprising initiating storage of the telemetry data to non-volatile memory of the memory device, wherein the power loss protection circuit is external to the memory device and wherein the power loss protection circuit is configured to provide the power loss signal to the memory device.

9. The method of claim 8, wherein the sensor is an accelerometer, and wherein the sensor data is accelerometer data.

10. The method of claim 8, wherein the threshold is one or more of a first threshold or a second threshold, wherein the first threshold is associated with an acceleration of the vehicle, and wherein the second threshold is associated with a deceleration of the vehicle.

11. The method of claim 8, wherein the sensor is a temperature sensor, and wherein the sensor data is temperature data.

12. The method of claim 8, wherein the telemetry data includes one or more of audio data or video data associated with the vehicle.

13. The method of claim 8, wherein initiating the emergency power shutdown of the memory device comprises:
terminating an ongoing memory operation to prevent the loss of data; or
completing the ongoing memory operation prior to an expected occurrence of an actual incident.

14. The method of claim 8, wherein obtaining the sensor data comprises obtaining the sensor data at a predefined sampling rate.

15. An apparatus, comprising:
means for obtaining sensor data;
means for comparing the sensor data to a threshold;
means for detecting, based on a comparison of the sensor data and the threshold, a potential incident associated with one or more of the apparatus or a vehicle associated with the apparatus; and
means for initiating, in response to detection of the potential incident and without obtaining a power loss signal from a power loss protection circuit, an emergency power shutdown of the apparatus to prevent a loss of telemetry data associated with the apparatus, the emergency power shutdown comprising initiating storage of the telemetry data to non-volatile memory of a memory device of the apparatus, wherein the power loss protection circuit is external to the memory device and wherein the power loss protection circuit is configured to provide the power loss signal to the apparatus.

16. The apparatus of claim 15, wherein the sensor data is accelerometer data or temperature data.

17. The apparatus of claim 15, wherein the threshold is one or more of a first threshold or a second threshold, wherein the first threshold is associated with an acceleration of the vehicle, and wherein the second threshold is associated with a deceleration of the vehicle.

18. The apparatus of claim 15, wherein the telemetry data includes one or more of audio data or video data associated with the vehicle.

19. The apparatus of claim 15, wherein the means for initiating the emergency power shutdown of the apparatus comprises:

means for terminating an ongoing memory operation to prevent the loss of data; or means for completing the ongoing memory operation prior to an expected occurrence of an actual incident.

20. The apparatus of claim 15, wherein the means for obtaining the sensor data comprise means for obtaining the sensor data at a predefined sampling rate.

* * * * *